Aug. 26, 1958

O. N. DAVIS 2,848,798

COMBINATION WORK PIECE ALIGNER AND
CLAMPING TOOL

Filed Sept. 26, 1956

INVENTOR.
OSCAR N. DAVIS
BY Hubert Miller
ATTORNEY

2,848,798

COMBINATION WORK PIECE ALIGNER AND CLAMPING TOOL

Oscar N. Davis, Wichita, Kans., assignor to Dulock, Inc., Wichita, Kans., a corporation of Kansas Application September 26, 1956, Serial No. 612,187

1 Claim. (Cl. 29—271)

This invention relates to work positioning devices, and pertains more particularly to a tool for aligning and clamping work pieces together. In this regard, there are a number of situations where one part must be accurately positioned with respect to another. One such instance is in conjunction with removable jig parts.

Accordingly, one object of the present invention is to align two work pieces in a highly accurate manner. Also, it is an aim of the invention to preserve the accuracy of alignment throughout subsequent work performing operations, even though the clamped pieces are subjected to considerable vibration or jarring.

Another object of the invention is to provide a tool of the foregoing character that is of very simple construction, thereby encouraging its use in large numbers. For instance, the low cost of the tool, due to its simplicity, induces its use on seldomly used parts, the tool merely being left in a clamping position during periods of idleness of the work pieces.

A further object is to provide a combined aligning and clamping tool that can be quickly installed and removed.

Still another object of the invention is to provide a tool of the type referred to that is not apt to wear out even though subjected to prolonged useage. Furthermore, the envisaged tool is of a character that resists breakage.

The invention, together with other objects attending its production, will be more clearly understood when the following description is read in connection with the accompanying drawing, in which.

Figure 1:
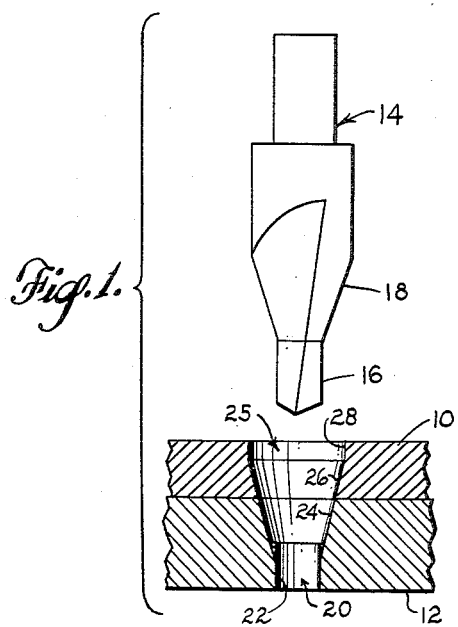
Figure 1 is a view in elevation showing the completion of an initial procedural step in the preparation of two plates or work pieces that are to be oriented accurately with respect to each other.

Referring first to Figure 1 of the drawing, two confronting work pieces in the form of an upper plate 10 and a lower plate 12 are depicted. By means of a special tool denoted 14 having a bottom twist drill portion 16 and an upper countersink portion 18, the plates 10 and 12 are initially prepared. This initial preparation results in the formation of an aperture 20 in the plate 12 having a cylindrical portion 22 merging into an upwardly diverging tapered portion 24. The plate 10 is formed with an aperture 25 having a lower tapered portion 26 forming a continuation of the tapered portion 24, this portion 26 merging into an upper cylindrical portion 28.

Figure 2:
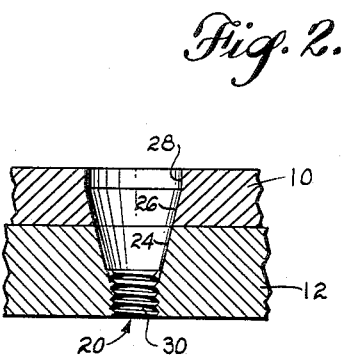
Figure 2 is a similar view taken after a tapping operation has been performed.

The second and final procedural step in the preparation of the plates 10 and 12 is to tap the cylindrical portion 22. Threads produced as a result of the tapping operation have been designated in Figure 2 by the numeral 30.

Figure 3:
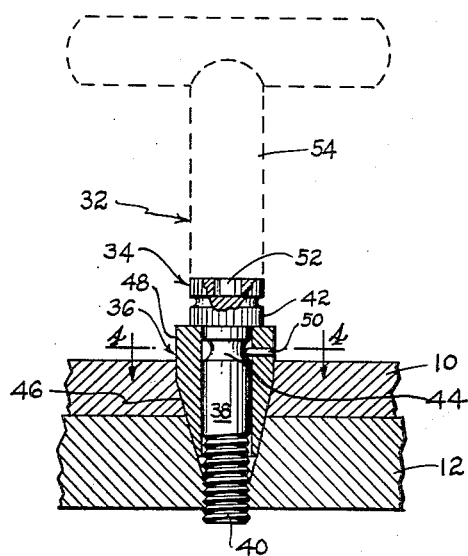
Figure 3 is a view of the two plates with my combination work piece aligner and clamping tool installed.
Figure 4:
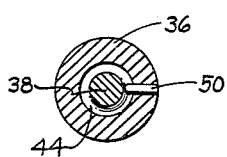
Figure 4 is a sectional view of the tool taken in the direction of line 4—4 of Figure 3.

Coming now to a description of the combination work piece aligner and clamping tool, which has been indicated generally in Figure 3 by the reference numeral 32, this tool includes a bolt member 34 and a sleeve member 36. The bolt member 34 comprises a shank 38 having a threaded lower end portion 40 and an enlarged upper end portion in the form of a head 42. Intermediate the threaded end 40 and the headed end 42 is an annular groove 44, the purpose of which will presently be explained The sleeve member 36 encircles only an axial portion of the shank 38, leaving most of the threaded end 40 projecting therebeyond. The lower end portion of the member 36 is tapered, having assigned thereto the number 46. The degree of taper given to the end portion 46 is complemental with that of the aperture portions 24 and 26, and as is obvious the narrowed end of the tapered portion 46 is nearer the threaded end 40. The upper end 48 of the sleeve member 36 is cylindrical, being of the same diameter as the aperture portion 28.

A pin 50 extends radially inwardly through the sleeve member 36 and its inner end is received or engaged in the annular groove 44. By axially locating the pin 50 the proper distance from the upper extremity of the sleeve member 36 it is possible to permit the underside of the head 42 to bear directly upon the upper end of the sleeve member. The desirability of this will become manifest in the ensuing operational description. At any rate it is now apparent that the pin 50, which is press fitted into the sleeve member 36, will prevent axial separation of the members 34 and 36.

The manner of rotating the bolt member 34 is discretionary. As shown in solid outline, a socket 52 is formed in the top of the head 42 for the accommodation of a socket wrench. As shown in phantom outline, a T-shaped handle 54 has been welded onto the head 42 as an alternate way. Both of these two systems of rotating the bolt member 34 have been found satisfactory, and if desired the head may be provided with hexagonal flats for the accommodation of an open-end wrench.

The manner in which my tool 32 is used is believed readily apparent from the preceding description. However, a specific explanation of its operation may prove of assistance in appreciating more fully the benefits to be derived from its use. Therefore, it will be assumed that the plates or work pieces 10 and 12 have been initially placed in the proper relationship with respect to each other and that the apertures 20 and 25 have been formed with the plates so positioned. Actually more than one set of apertures 20, 25 would normally be required in order to relocate accurately the plates 10 and 12, unless the plates are pivotally connected at some point. However, once having formed the apertures 20, 25 these apertures can repeatedly be returned to a true axial alignment with my device 32.

To do this, all that is necessary is to turn the head 42 in a direction to advance the threaded end 40 into the tapped portion 30 of the aperture 20. The pin 50, because of its free engagement with the groove 44, permits relative rotation of the bolt member 34 with respect to the sleeve member 36. Continued rotation of the head 42 in a clockwise direction when viewed from above will cause the sleeve member 36 to be forced downwardly. Preferably, the pin 50 is axially located so that the pressural action is derived from the head 42 bearing against the upper end of the sleeve member 36. The force applied to the sleeve member 36 via the bolt member 34 is instrumental in urging said sleeve member downwardly. Owing to the complemental tapered relationship it can be recognized that any lateral displacement of one plate relative to the other will be eliminated, for the tapered portion 46, through its engagement with the tapered aperture portions 24 and 26, will forcibly shift the plates 10 and 12 into a position in which the apertures 20 and 25 are truly aligned. At the same time these plates 10, 12 are firmly clamped together and the alignment will thereafter be maintained until the bolt member 34 is loosened by reverse rotation thereof. Counterclockwise rotation of the bolt member 34 will withdraw the sleeve member 36 because of the interengagement afforded by the pin 50. Since it is contemplated that more force will be applied when tightening the bolt member 34, especially if any lateral shifting of the plates is required than when loosening said bolt member, it becomes obvious that the head should bear upon the sleeve member 36 during installation. The retraction or removal of the device 10 is a comparatively force-free operation.

Having described the invention with sufficient clarity to enable those familiar with this art to construct and use it, I claim:

A tool adapted for aligning and clamping adjacent work pieces which have been drilled with a partial taper and tapped and for thereafter withdrawing said tool after work on said work pieces have been performed; comprising a bolt having a shank threaded at one of its ends adapted for engagement with the threaded portion of one of the work pieces, said shank having an annular groove adjacent its opposite end, a sleeve member circumscribing a portion of said shank and having a tapered end narrowing in the direction of said threaded shank portion, the taper of said sleeve cooperating with the drilled tapering portions of said work pieces and adapted to align same, said sleeve member having a projection on its internal wall cooperating with and extending into the annular groove of said shank for permitting relative rotation between said bolt member and sleeve member but preventing appreciable relative longitudinal movement of the sleeve on the bolt so that the sleeve will align and clamp said work pieces when said bolt is rotated in one direction by its threads cooperating with the threads of one of the work pieces and the tapering portions of the sleeve and work pieces, and to reverse such action when said bolt is rotated in an opposite direction.

References Cited in the file of this patent

UNITED STATES PATENTS

| | | |
|---|---|---|
| 864,226 | Blodgett | Aug. 27, 1907 |
| 1,310,806 | Rollins | July 22, 1919 |
| 1,311,128 | Kilgour | July 22, 1919 |
| 1,355,028 | Blessing et al. | Oct. 5, 1920 |